(12) United States Patent
Shitara et al.

(10) Patent No.: US 7,929,232 B2
(45) Date of Patent: Apr. 19, 2011

(54) TEST METHOD OF A MAGNETIC DISK AND MAGNECTIC DISK TESTER

(75) Inventors: Kenichi Shitara, Ashigarakami-gun (JP); Haruyoshi Kato, Ashigarakami-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 451 days.

(21) Appl. No.: 12/034,011

(22) Filed: Feb. 20, 2008

(65) Prior Publication Data

US 2008/0198493 A1    Aug. 21, 2008

(30) Foreign Application Priority Data

Feb. 21, 2007   (JP) ................................ 2007-040559

(51) Int. Cl.
  *G11B 27/36*   (2006.01)
(52) U.S. Cl. ........................................................ 360/31
(58) Field of Classification Search .................. 360/31, 360/60, 61, 64, 58, 75, 72.2, 78.05
See application file for complete search history.

(56) References Cited

U.S. PATENT DOCUMENTS

| | | | | |
|---|---|---|---|---|
| 5,057,950 A | * | 10/1991 | Ozaki et al. | 360/72.2 |
| 5,675,586 A | * | 10/1997 | Sako et al. | 714/701 |
| 6,166,536 A | * | 12/2000 | Chen et al. | 324/212 |
| 6,265,868 B1 | * | 7/2001 | Richter | 324/212 |
| 6,317,281 B1 | * | 11/2001 | Ogawa et al. | 360/60 |
| 6,519,107 B1 | * | 2/2003 | Ehrlich et al. | 360/75 |
| 6,696,831 B2 | * | 2/2004 | Nozu | 324/210 |
| 6,731,446 B2 | * | 5/2004 | Ikeda et al. | 360/59 |
| 7,075,748 B2 | * | 7/2006 | White et al. | 360/78.05 |
| 7,109,701 B2 | * | 9/2006 | Perez | 324/210 |
| 7,196,513 B2 | * | 3/2007 | Perez | 324/210 |
| 7,271,974 B2 | * | 9/2007 | Fukuyama et al. | 360/75 |
| 7,725,794 B2 | * | 5/2010 | Yamada | 714/743 |

FOREIGN PATENT DOCUMENTS

| | | |
|---|---|---|
| JP | 10-275434 | 10/1998 |
| JP | 2000-57501 | 2/2000 |
| JP | 2000-57502 | 2/2000 |

* cited by examiner

*Primary Examiner* — Fred Tzeng
(74) *Attorney, Agent, or Firm* — Mattingly & Malur, PC.

(57) ABSTRACT

A test burst signal is overwritten from a write end position over a connecting region determined by positional deviation between a read head and a write head and a peripheral speed of a disk. Since, therefore, the overwritten signal portion is overlapped on the test burst signal written at a write start point, it is possible to reduce a width of the connecting region to thereby reduce a test inhibit region.

16 Claims, 3 Drawing Sheets

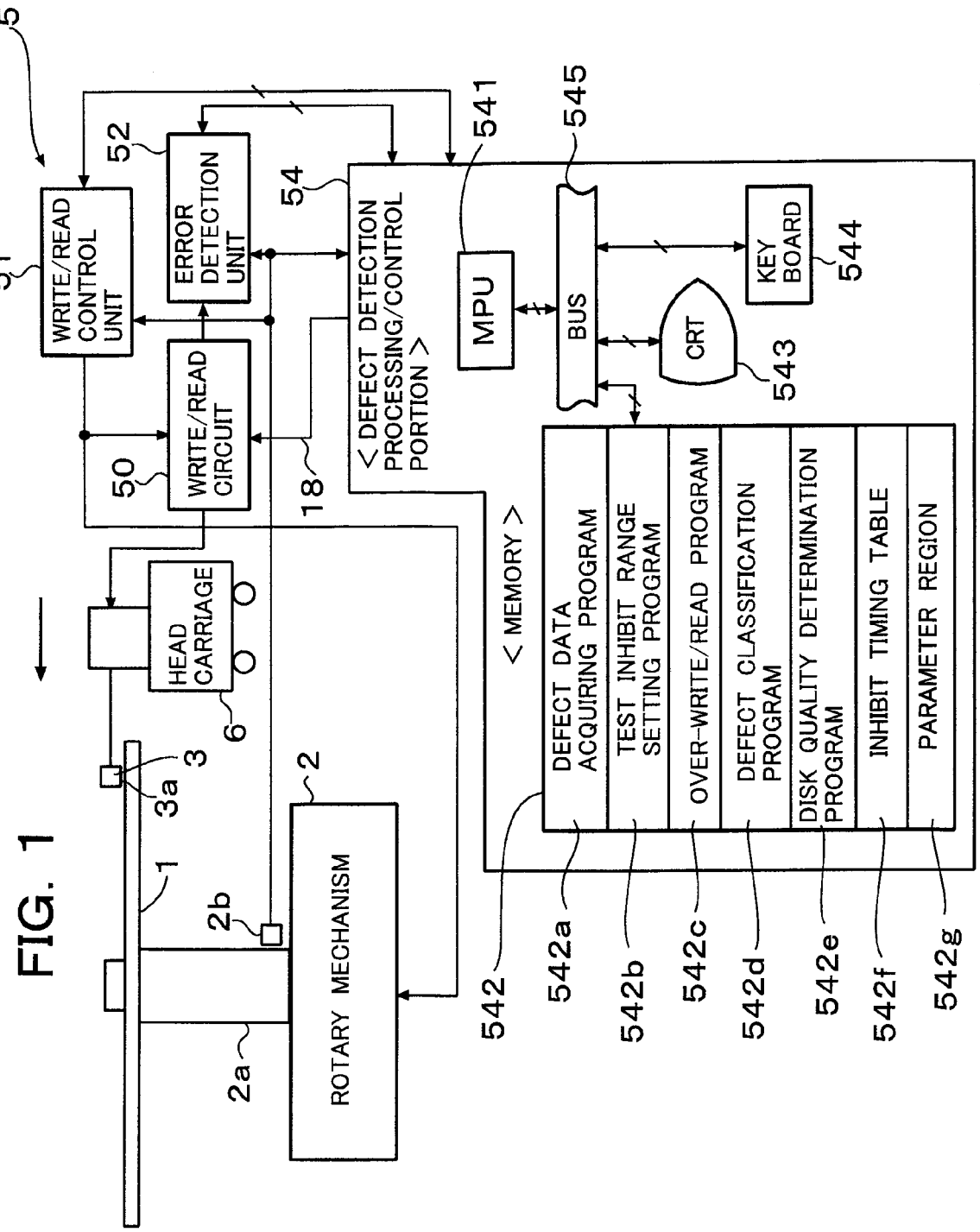

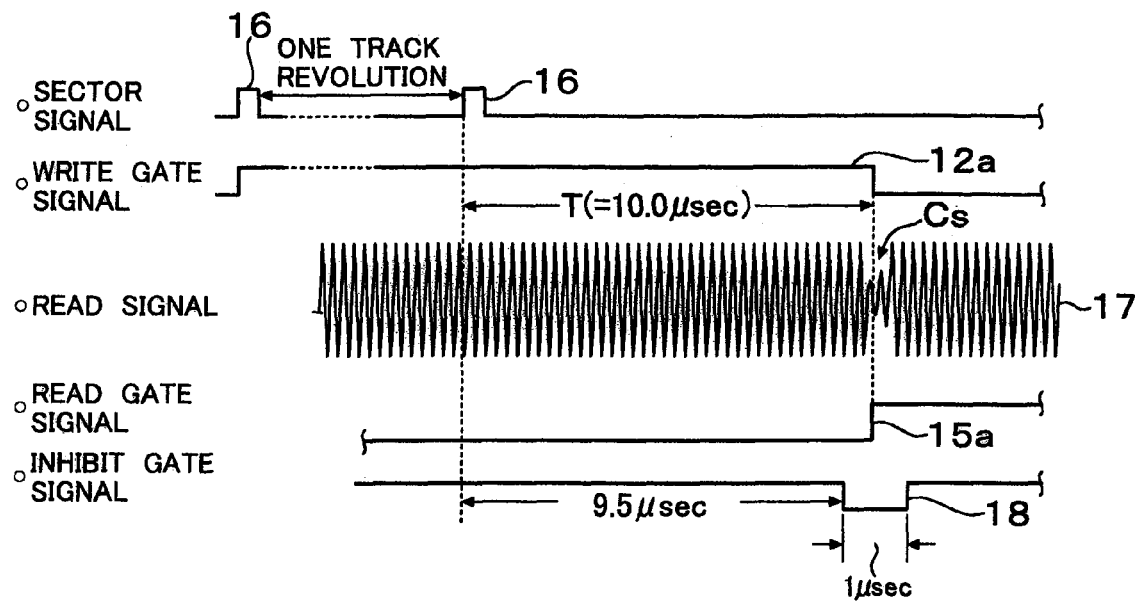
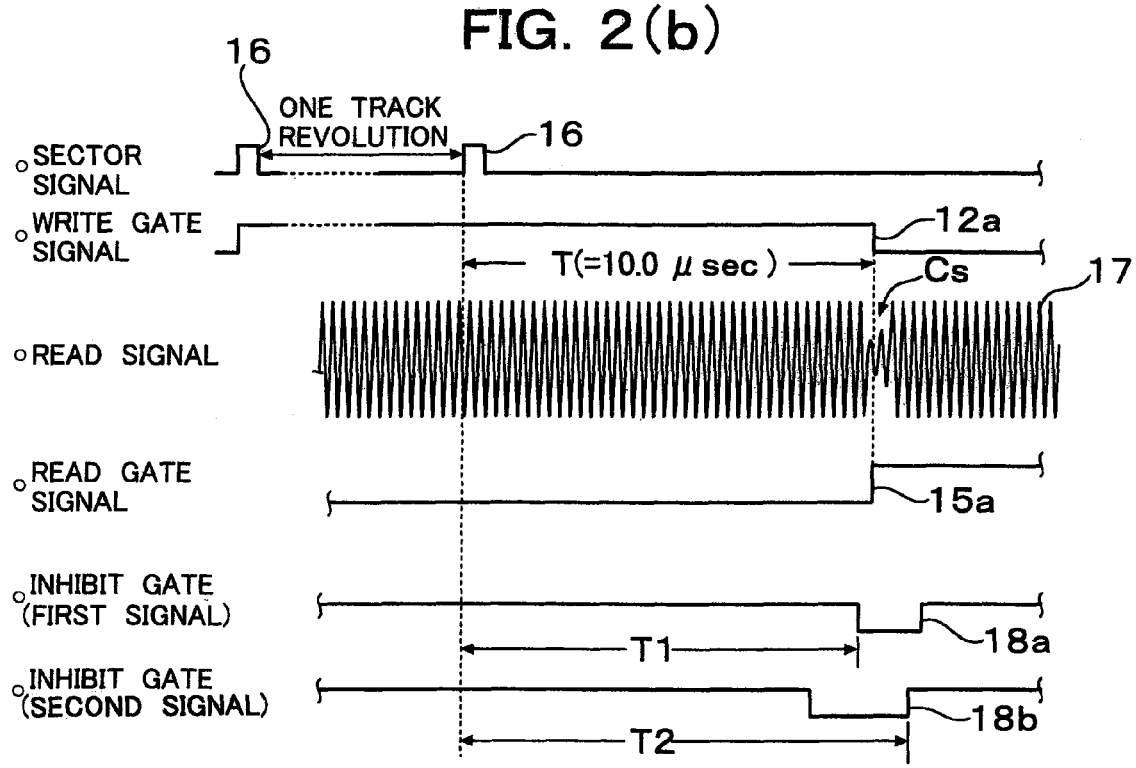

FIG. 3
| ROTATION NUMBER | PERIPHERAL SPEED | A=3μn | | A=4μn | | OVER-WRITE PERIOD |
|---|---|---|---|---|---|---|
| | | T1 | T2 | T1 | T2 | |
| 2000rpm | 4.188m/s | ××× | ××× | ××× | ××× | T=10μsec |
| 2500rpm | 5.236m/s | ××× | ××× | ××× | ××× | |
| 3000rpm | 6.238m/s | ××× | ××× | ××× | ××× | T=5μsec |
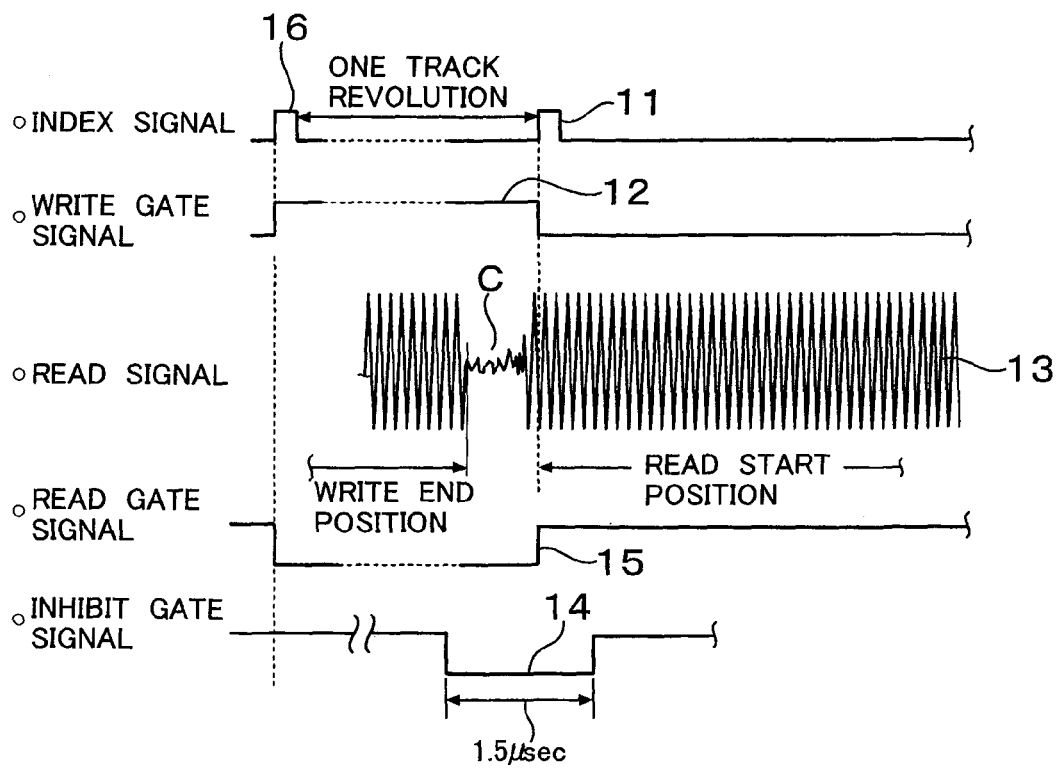
FIG. 4(a)
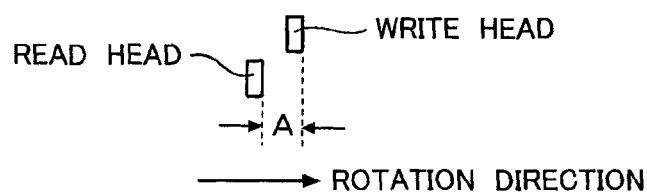
FIG. 4(b)

TEST METHOD OF A MAGNETIC DISK AND MAGNECTIC DISK TESTER

TECHNICAL FIELD

This invention relates to a test method of a magnetic disk and a magnetic disk tester and, in particular, this invention relates to a magnetic disk certifier (referred to as "certifier", hereinafter) capable of reducing a connecting region (a region for connecting a write end of a test signal to a write start of the test signal) and reducing an defect detection error rate due to the connecting region of the magnetic disk.

BACKGROUND ART

When there is an abnormality in a magnetic medium, an error may be generated in write data or read data stored on a hard magnetic disk (referred to as a "magnetic disk" or simply "disk", hereinafter) used in a computer system. Therefore, a magnetic medium is certified by writing predetermined test data, for example, FFh data, on predetermined tracks of the magnetic disk and reading it by a certifier.

Incidentally, h of FFh indicates hexadecimal notation and FFh means data including bits all of which are "1". A test data having a specified frequency signal of this kind is known as a "test burst signal".

A bit error to be detected by the certifier includes a mixing error (including a bit having a level lower than a predetermined threshold value), spike error, positional modulation error and magnetic modulation error, etc. As another form of error, there is an extra error which is a bit detected after a data on the disk has been erased.

In a disk drive, a coil type magnetic head (inductive head) is used to write data and an MR head is used to read data. The write head and the read head are integrated as a composite head. The recording densities of the disk drives continue to improve with time.

Testing of disks for defects is performed by using a concentric circle test method or spiral test method. In the concentric circle test method, the disk defect is detected by searching respective tracks by radially moving a magnetic head mounted on a head carriage stepwise correspondingly to the respective tracks while rotating the disk. In the spiral test method, the disk defect is detected by scanning tracks of a rotating disk by continuously moving a magnetic head spirally with respect to the rotating disk.

The efficiency of the concentric circle test is low since it takes a long time in order to test the entirety of the tracks. However, the number of test tracks has increased recently due to improvements in the disk arts. Practically, the number of defective tracks is in a rage from 100 to 200, at most, which corresponds to 1/10 to 1/100 of the all tracks. Therefore, the spiral test or a thinned concentric circle test in which test tracks are partially thinned is usually used. Incidentally, the spiral test can be performed by thinning pitch.

Such techniques are described in JP-A-10-275434, JP-A-2000-57501 and JP-A-2000-57502.

In the concentric circle test method, writing of a test burst signal in one track is started by an index signal (or a sector signal) indicating a reference position of the disk and is ended by an index signal (or a sector signal) after one rotation of the disk. Therefore, a connecting region appears between the write start position and the write end position of the test burst signal.

The connecting region occurs for two reasons. One of the reasons is that the peripheral speed of a rotating disk is slightly different for every rotation and the write start position and the write end position do not match completely. The other reason is that there is a predetermined positional deviation (3·m to 5·m) between the read head and the write head.

Therefore, even if the magnetic head is controlled such that the write start position and the write end position are completely coincident, there is a deviation of the read signal correspondingly to the read head. It is practically difficult to perform control such that the positional deviation between the read head and the write head is corrected while the peripheral speed of the disk is varied slightly. Therefore, the connecting region C in FIG. 4(a) appears in the read signal for one track. Incidentally, FIG. 4 shows the generation of timing for a conventional test inhibit gate signal.

When the connecting region C is tested in the disk certifier, the connecting region C is detected as an error. Therefore, a test inhibit gate signal 14 having a window width covering the connecting region C of the read signal shown in FIG. 4(a) is generated to indicate that a portion (the connecting region C) of a track of the magnetic disk is a non-test region. Incidentally, a low level "L" of the inhibit gate signal 14 or an inhibit gate signal 18 to be described later is significant and this period is used as a test inhibit period. During this period, a read operation of a read circuit portion of the test signal write/read circuit is inhibited in order to invalidate the read signal itself.

In FIG. 4(a), reference numeral 11 depicts an index signal, 12 a write gate signal, 13 a read signal of a test burst signal written in one track and 14 an inhibit gate signal. Reference numeral 15 depicts a read gate signal which may be generated by inverting the write gate signal 12.

Incidentally, it is possible that writing of the test burst signal for one track is started not by the index signal 11 but instead by a sector signal as a reference and is ended by the same sector signal after the one track. An embodiment of this invention to be described later uses this system.

In the defect test of a disk, it is usual that the width of the connecting region C which is determined as the test inhibit period is set to a maximum with respect to a track to be tested under consideration of the maximum variation of the peripheral speed of disk and a positional deviation between the read head and the write head. Therefore, the window of the inhibit gate signal 14 is set with respect to the connecting region C having a maximum width corresponding to the rotation number and the peripheral speed of the disk by using the write end point as a reference.

FIG. 4(b) shows a positional relation of the MR head. Assuming that the positional deviation between the read head and the write head is A[m], the window width W [sec] of the inhibit gate signal 14 is selected such that the relation A[m]/peripheral speed [m/sec]<W [sec] is established.

Assuming that the rotation number of the disk is within a range from 2000 rpm to 3000 rpm (corresponding to the peripheral speed in a range from 4.1 m/sec to 6.3 m/sec of a disk whose radius is about 20 mm) and the positional deviation A between the read head and the write head is within a range from 3·m to 5·m, the window width W becomes about 1.5·m. This is the usual and currently set window width W.

When the recording density of one track increases, an amount of information recorded in the width of 1.5·sec of the non-test region is increased correspondingly. Therefore, in order to guarantee disk quality, it is requested to reduce the width of the non-teat region to as small a value as possible. However, when the width of the non-test region is reduced, a defect detection error rate increases and the number of disk which are re-tested increases, therefore resulting in decreases in testing efficiency.

SUMMARY OF THE INVENTION

The present invention was made to solve the above problems and an object of this invention is to provide a magnetic disk test method or a certifier with which it is possible to reduce a connecting region of a test burst signal, which becomes a non-test area, in a test track and to reduce the defect detection error rate of the connecting region in the error detection of the magnetic disk.

A construction of a magnetic disk test method according to a first invention comprises the steps of writing a test signal for one track revolution of a predetermined track, further writing the test signal over the one track revolution, setting a test inhibit region having a predetermined width before and after a write end point of the overwrite as a reference and reading the test signal from the predetermined track, wherein the overwrite is performed over a connecting region between a write end point and a write start point of the test signal in a predetermined track determined by an amount of positional deviation of the heads and a peripheral speed of the magnetic disk such that the predetermined width of the test inhibit region becomes narrower than a width of the connecting region.

The secondly by comprising the steps of writing a test signal for one track revolution in a predetermined track and further writing the test data over the one track revolution of the track, generating a test inhibit gate signal for invalidating a read signal of a predetermined track or invalidating an error detected in a predetermined track before a write end point of the overwrite or invalidating error detected in the predetermined track and reading the test data from a predetermined track, wherein the overwrite is performed over a connecting region between a write end point and a write start point of a test signal in a predetermined track determined by a positional deviation of heads and a peripheral speed of a magnetic disk, the test inhibit gate signal is generated by generating a first signal indicative of a start timing from the write end point and a second signal indicative of an end timing such that a period between the first signal and the second signal becomes shorter than the width of the connecting region.

Incidentally, as mentioned previously, the width of the connecting region is made maximal under consideration of the maximal change of peripheral speed of the rotating disk and the positional deviation between the read head and the write head.

In this invention, the test burst signal is overwritten from the write end position over the connecting region C (refer to FIG. 4(a)) which is determined by the positional deviation between the read head and the write head and the peripheral speed of the disk. Therefore, a portion of the test burst signal written from the write start point is overwritten at a time point exceeding the write start point, so that the signal of the portion is substantially overwritten. Due to this overlapped write, the connecting portion C disappears.

It is usual that, when data is overwritten in a track by recording new data by overwriting data on the track of the magnetic disk, a high level read signal of data corresponding to the substantial new data is generated. Therefore, the test burst signal written in the write start area and the test burst signal in the write end point of the overwrite are connected by an area in which a waveform corresponding to several to several tens of bits are deformed and the deformed waveform portion due to the overwrite becomes a new connecting region. Therefore, it is enough to invalidate only the new connecting region as a non-test region.

The new connecting region is substantially uninfluenced by the positional deviation between the read head and the write head and its width is smaller than the width of the connecting region C. Depending on the peripheral speed of the disk, the width of the new connecting region may become narrower than 0.5·sec.

Assuming that the rotation number of a disk is in a range from 2000 rpm to 3000 rpm (corresponding to a range of peripheral speed of a disk having radium of about 20 mm from 4.1 m/sec to 6.3 m/sec) and the positional deviation between the heads is in a range from 3·m to 5·m, the window width of the inhibit gate signal becomes about 0.5·sec before and after the overwrite end point. It is practical that, although the window width becomes wider than the above mentioned window width in order to reduce the defect detection error rate, the non-test region becomes narrower since the width can be reduced to about 1·sec.

As a result, this invention can reduce the non-test area which is the connecting region of the test burst signal in the test track and reduce the defect detection error rate of the connecting region when the error detection is performed by the certifier.

BRIEF DESCRIPTION OF THE DRAWINGS

FIG. 1 is a block diagram showing a certifier according to an embodiment of this invention, FIG. 2(a) shows an example of a generation timing of a test inhibit gate signal, FIG. 2(b) shows another example of a generation timing of a test inhibit gate signal, FIG. 3 shows an inhibit timing table, FIG. 4(a) shows a generating timing of a conventional test inhibit gate signal, and FIG. 4(b) shows a positional relation of the MR head.

DESCRIPTION OF THE PREFERRED EMBODIMENT

In a test device 5 shown in FIG. 1, a magnetic disk 1 is mounted on a spindle 2a of a rotary mechanism 2. A rotary encoder 2b for detecting a rotation state of the spindle 2a generates a pulse (index signal INDX) indicating a rotation reference position of the magnetic disk 1 and a pulse indicating a rotation angle·(corresponding to rotation amount of the magnetic disk) from the index signal INDX). These pulses are sent to a write/read control circuit 51, an error detection unit 52 and a defect detection processing/control device 54.

In the defect test of a rotating magnetic disk 1 by the test device 5, the defect detection processing/control portion 54 includes a microprocessor MPU 541 which supplies a test pitch as a moving speed of the rotating magnetic disk 1 in the radial direction and a test burst signal such as FFh data to the write/read control circuit 51.

Incidentally, sector signals obtained by dividing one track revolution of a disk by a predetermined number, are generated in synchronism with the index signal INDX by the rotary encoder 2b. These sector signals may be generated in the defect detection processing/control portion 54 by dividing one track revolution to a plurality of equal regions by the MPU 541 in response to the index signal INDX by a software processing and sent to the respective circuits.

The write/read control unit 51 includes a head carriage position control circuit. The head carriage position control circuit drives the head carriage 6 to seek a predetermined test track by the magnetic head 3 at a predetermined moving speed corresponding to the test pitch on the magnetic disk 1 in the radial direction to thereby position the magnetic head 3 in the predetermined test track. The write/read control unit 51 converts the test burst signal supplied to the write side inductive magnetic head 3a into a signal having a predetermined current value, synchronizes the current signal with the index signal INDX or the sector signal at a predetermine timing and sends the synchronized current signal to a write circuit of the write/read circuit 50. The write circuit performs a write processing of the test burst signal by driving the magnetic head 3.

Upon the index signal INDX or the sector signal which indicates a revolution reference position of a track, the write/read control unit 51 tests a plurality of tracks by the concentric circle test method with using the revolution reference position as a start point. In this case, the test burst signal is written in one test track and, thereafter, the test burst signal is overwritten in a region wider than the connecting region C. Then, the read of the test burst signal is started by a read MR head of the magnetic head 3.

Incidentally, the inductive magnetic head (write head) 3a and the MR head (read head) are integrally assembled in the magnetic head 3 shown in FIG. 4(b). The output of the rotary encoder 2b is inputted to the write/read control unit 51, the error detection unit 52 and the defect detection processing/control portion 54.

Although the magnetic head is also provided on a rear surface side of the disk, it is not shown since the magnetic head is similar to the magnetic head 3 on the front surface side.

The test burst signal read out by the magnetic head 3 is supplied to the write/read circuit 50 and then supplied, as a read signal, to the error detection unit 52 in which the error detection is performed. The error bit data detected by the error detection unit 52 is sent to the defect detection processing/control portion 54 of the test device 5 in which a predetermined analysis and the data processing are performed for defect detection on the basis of the error bit data.

The defect detection processing/control portion 54 includes the MPU 541, a memory 542, a CRT display 543 and a key board 544, etc., which are mutually connected by a bus 545. The memory 542 includes a defect data acquiring program 542a, a test inhibit range setting program 542b, an over-write/read program 542c, a defect classification program 542d and a disk quality determination program 542e. The defect detection processing/control portion 54 further includes an inhibit timing table 542f and a parameter region 542g, etc.

The MPU 541 executes the defect data acquiring program 542a to position the magnetic head 3 in a predetermined test track and executes the over-write/read program 542c to write the test burst signal for a region which exceeds a sum of the one revolution and the connecting region C. Then, the MPU 541 reads the test burst signal to test the write track. A plurality of tracks are scanned by using the concentric circle test method in this manner to test all or a predetermined number of the tracks.

In the test of the respective tracks, the test inhibit region setting program 542b is executed as will be described later and an inhibit gate signal 18 is sent to a read portion of the write/read circuit 50 to invalidate a read signal at a position different from the position of the connecting region C in a width narrower than the width of the connecting region C.

The detected defect signal is stored as defect data (corresponding to particular kinds of defects) in a working region of memory together with coordinates of the defect signal. Incidentally, the coordinates of the detected defect are calculated according to the positioning control of the magnetic head 3 by the defect detection processing/control portion 54 upon the pulse from the rotary encoder 2b.

The MPU 541 executes the overwrite/read program 542c and the test inhibit region setting program 542b at an overwrite end point of the test burst signal for the region exceeding the sum of the one revolution and the connecting region C.

Incidentally, the defect data includes spike error, positive modulation error, negative modulation error, mixing error and extra error, etc.

FIG. 2 shows the generation timing of the inhibit gate signal corresponding to the overwrite by the MPU 541 executing the test inhibit range setting program 542b. Incidentally, a reference numeral 16 depicts a write start sector signal, 17 a read signal of a test burst signal written in one track and 18, 18a and 18b are inhibit gate signals.

As shown in FIG. 2(a), the MPU 541 executes the over-write/read program 542c to start the write of the test burst signal at an initial write start sector signal 16, to start a time count by using the write start sector signal 16 after one revolution and to overwrite the test data in the test track in a period T after the write start sector signal 16.

The overwrite period T is stored in the parameter region 542g and is, for example, 10·sec. The period T corresponds to a write time longer than 1.5·sec required for obtaining a read signal corresponding to the usual connecting region C. In this embodiment, the test burst signal is over-written for 10·sec corresponding to the time of the read signal. That is, the write of the magnetic head 3 is ended after the scanning for 10·sec from the end of write for one revolution by the MPU 541.

As a result, a new connecting region Cs shown in FIG. 2(a) is shifted from the write end point (the write start time point of one revolution immediately before) by 10·sec. In this case, the connecting region C disappears due to the overwrite of the test burst signal from the write start sector signal 16 and a connecting state in which the waveform of several bits to several tens of bits is changed due to this overwrite appears as a new connecting region Cs.

Therefore, it is enough to inhibit the connecting region Cs. The position of the connecting region Cs becomes different from the position of the connecting region C shown in FIG. 4 and has a width narrower than that of the connecting region C by 0.5·sec as shown by the connecting region Cs in FIG. 2(a).

In a case where the rotation number of the disk is within a range from 2000 rpm to 3000 rpm (from peripheral speed 4.1 m/sec to 6.3 m/sec) and the positional deviation A between the read head and the write head is within a range from 3·sec to 5·sec, the inhibit gate signal is set using the overwrite end point as a reference. Therefore, the width of the connecting region Cs can be as narrow as about 0.5·sec and can be about 1·sec at most under consideration of reducing the error defect detection of the connecting region.

The MPU 541 executes the test inhibit range setting program 542b to generate the inhibit gate signal 18 shown in FIG. 2(a) to thereby invalidate the read signal of the read circuit of the write/read circuit 50. In this case, upon the write start sector signal 16, the MPU 541 starts counting time in accordance with the write start sector signal 16 and the inhibit gate signal 18 is generated as a window signal having a width of 1·sec which is a difference between 9.5·sec to 10.5·sec. Incidentally, the window period which is generated with timing from 9.5·sec to 10.5·sec is stored in the parameter region 542g corresponding to the overwrite period T.

As a result, it is possible to reduce the non-test area generated as the connecting region of the test burst signal in the track from 1.5·sec to 1.0·sec. As compared with the conventional region, this region can be reduced by at least 0.5·sec. Further, when the peripheral speed is increased to 5.0 m/sec, it is possible to reduce the non-test region by substantially 2.5·m.

FIG. 2(b) shows an example in which a first signal indicating the start timing of the inhibit gate before the overwrite end point and a second signal indicating the end timing of the inhibit gate after the overwrite end point are generated. In this case, the inhibit gate is generated by enabling the width from the first signal to the second signal to regulate. The range of regulation of the pulse width is made narrower than the usual connecting region C.

In FIG. 2(b), the first signal 18a for setting a start timing of the inhibit gate signal is fallen after T1·sec from the write start sector signal 16 and a front edge (fall timing) of the first signal becomes the fall timing of the inhibit gate signal 18 in FIG. 2(a). The second signal 18b for setting an end timing of the inhibit gate signal is fallen after T2·sec from the write start sector signal 16 and a rear edge (rise timing) of the second signal becomes the rise timing of the inhibit gate signal 18 in FIG. 2(a).

Thus, the width of the inhibit gate signal 18 is determined in between the front edge T2 of the first signal 18a and the rear edge T1 of the second signal 18b.

The generating timings of the first signal 18a and the second signal 18b are stored in the inhibit timing table 542f and the MPU 541 executes the test inhibit range setting program 542b to generate the first signal and the second signal by referring to the inhibit timing table 542f.

As shown in FIG. 3, the inhibit timing table 542f includes a rotation number column 19a, a peripheral speed column 19b and read/write deviation amount columns 19c and 19d. Each of the read/write deviation amount columns is divided to a column of the first signal generating period T1 and a column of the second signal generating period T2. A column 19e of the overwrite period T is further included in the inhibit timing table 542f.

According to the input data, the periods T1 and T2 are determined by referring the rotation number or the peripheral speed and the read/write deviation amount A of the inhibit timing table 542f.

Incidentally, the periods T1 and T2 are counted using the write start signal 16 as a reference and the overwrite period T is T1+·. Therefore, the overwrite period T may be stored by · which is a time corresponding to several to several tens of bits of the test burst signal.

Therefore, the width of the inhibit gate signal 18 is set by the periods T2 and T1 of the two signals and regulated optionally.

In this embodiment, the window of the inhibit gate is set by determining the overwrite end point by counting time using the write start sector signal as a reference or by setting times before and after the overwrite end point using the write start sector signal as a reference. However, it is of course possible that these time references may be set by the index signal instead of the write start sector signal.

Further, in this embodiment, the inhibit gate signal is sent to the read circuit of the write/read circuit 50. However, the write/read circuit 50 may be controlled by sending the inhibit gate signal to the write/read control circuit 51.

Further, a portion of a test track on a magnetic disk may be used as a non-test region by stopping the error detection by sending the inhibit gate signal to the error detection unit 52. Further, the connecting region of the test track may be used as the non-test region by reading all of the errors from the error detection unit 52 in the defect detection processing/control device 54 and masking the portion of the inhibit gate signal by program processing.

Although, in this embodiment, the test data is read after the test data is overwritten in the test track, it is possible to sequentially read test data of a plurality of tracks after the test data are written by performing an overwrite exceeding one revolution of the track for the plurality of tracks.

The invention claimed is:

1. A magnetic disk test method for testing a magnetic disk by scanning a magnetic disk by a composite magnetic head having a write head and a read head which are deviated in position from each other in a track testing direction, writing a test signal in a predetermined track by the write head and reading the test signal by the read head, comprising the steps of:

writing the test signal for one track revolution of the predetermined track and further overwriting the test signal, to create an overwritten test signal, after the one track revolution, and setting a test inhibit region having a predetermined width before and after a write end point of the overwritten test signal as a reference and reading the test signal from the predetermined track, wherein the overwriting of the test signal is performed over a connecting region between a write end point and a write start point of the test signal in the predetermined track, where the write end point and the write start point are determined by an amount of a positional deviation between the write head and the read head and a peripheral speed of the magnetic disk such that the predetermined width is narrower than the width of the connecting region.

2. A magnetic disk test method claimed in claim 1, wherein the magnetic disk has a plurality of tracks that includes the predetermined track, and wherein a defect test of the magnetic disk is performed on concentric circles correspondingly to the plurality of the test tracks and the write end point is determined by using a sector signal in the write start point of the test signal or an index signal as a reference.

3. A magnetic disk test method claimed in claim 2, wherein the test inhibit region is set by generating a test inhibit gate signal for invalidating a read signal of the test signal or invalidating a detected error.

4. A magnetic disk test method claimed in claim 3, wherein the test inhibit gate signal is sent to a read circuit for reading the test signal, a width of the overwritten test signal and the predetermined width are stored in a memory as data, the write end point is determined by counting time by using the sector signal or the index signal as a reference according to the data of the width of the overwrite read out from the memory and the test inhibit gate signal is generated by counting time according to the data of the predetermined width read out from the memory.

5. A magnetic disk test method for testing a magnetic disk by scanning a magnetic disk by a composite magnetic head having a write head and a read head, which are deviated in position from each other in a track testing direction, writing a test signal in a predetermined track by the write head and reading the test signal by the read head, comprising the steps of:

writing the test signal for one track revolution of the predetermined track and further overwriting the test signal after the one track revolution, and reading the test signal as a test data from the predetermined track by generating a test inhibit gate signal for invalidating a read signal of the test data in the predetermined track or invalidating a detected error in the predetermined track, wherein overwriting of the test data is performed over a connecting region between a write end point and a write start point of the test signal in the predetermined track, where the write end point and the write start point are determined by an amount of the positional deviation between the write head and the read head and a peripheral speed of the magnetic disk, and wherein the test inhibit gate signal is generated by generating a first signal indicative of a start timing before the write end point and then generating a second signal indicative of an end timing, and a period between the first signal and the second signal is shorter than the width of the connecting region.

6. A magnetic disk test method claimed in claim 5, wherein the magnetic disk has a plurality of tracks that includes the predetermined track, and wherein a defect test of the magnetic disk is performed for concentric circles corresponding to the plurality of tracks respectively and the write end point is determined by using a sector signal at the write start point of the test signal or an index signal as a reference.

7. A magnetic disk test method claimed in claim 6, wherein the test inhibit gate signal has a test inhibit region determined by a predetermined width from the first signal to the second signal, an overwritten width and the predetermined width are stored as data in a memory, the write end point is determined according to data for the overwritten width read out from the memory and the first signal and the second signal are generated by counting time by using the sector signal or the index signal as a reference according to data read out from the memory.

8. A magnetic disk test method claimed in claim 7, wherein the memory includes a data table storing the overwritten width and the predetermined width and optimal data of the overwritten width and the predetermined width are selected by referring to the data table according to a test condition of the magnetic disk.

9. A magnetic disk tester for testing a magnetic disk by scanning a magnetic disk by a composite magnetic head having a write head and a read head which are deviated in position from each other in a track testing direction, writing a test signal in a predetermined track by said write head and reading the test signal by said read head, comprising a data write/read circuit, an error detection circuit and a defect detection processing device, wherein said defect detection processing device writes the test signal as a test data for one track revolution in the predetermined track through said data write/read circuit and further overwrites the test data after the one track revolution to set a test inhibit region having a predetermined width before and after a write end point of an overwrite of the test data as a reference and reads the test signal-data from the predetermined track through said data write/read circuit, the overwrite of the test data is performed over a connecting region connecting a write end point of the test data and a write start point of the test data in the predetermined track determined by an amount of the positional deviation between said write head and said read head and a peripheral speed of the magnetic disk, and the predetermined width is narrower than the width of the connecting region.

10. A magnetic disk tester claimed in claim 9, wherein the magnetic disk has a plurality of test tracks that includes the predetermined track, and wherein a defect test of the magnetic disk is performed for concentric circles corresponding to the plurality of the test tracks and the write end point is determined by using a sector signal in the write start point of the test signal or an index signal as a reference.

11. A magnetic disk tester claimed in claim 10, wherein the test inhibit region is set by generating a test inhibit gate signal for invalidating a read signal of the test data or invalidating a detected error.

12. A magnetic disk tester claimed in claim 11, wherein the test inhibit gate signal is sent to a read circuit for reading the test data, an overwritten width and the predetermined width are stored in a memory as data, the write end time point is determined by counting a time with the sector signal or the index signal as a reference according to data of the overwritten width read out from said memory and the test inhibit gate signal is generated by counting the time according to the data of the predetermined width read out from said memory.

13. A magnetic disk tester claimed in claim 11, wherein the test inhibit gate signal is sent to said error detection circuit to invalidate the detected error.

14. A magnetic disk tester for testing a magnetic disk by scanning a magnetic disk by a composite magnetic head having a write head and a read head which are deviated in position from each other in a track testing direction, writing a test signal in a predetermined track by said write head and reading the test signal by said read head; comprising a data write/read circuit, an error detection circuit and a defect detection processing device, wherein said defect detection processing device reads the test signal as a test data from the predetermined track through said data write/read circuit by writing the test data for one track revolution in the predetermined track through said data write/read circuit, further overwriting the test data after the one track revolution and setting a test inhibit gate signal for invalidating the read signal of the test data in the predetermined track or invalidating a detected error in the predetermined track by using the write end point of an overwrite of the test data for the predetermined track, the overwrite of the test data is performed over a connecting region connecting a write end point of the test data and a write start point of the test data in the predetermined track which are determined by an amount of the positional deviation between said write head and said read head and a peripheral speed of the magnetic disk, the test inhibit gate signal is generated by generating a first signal indicative of a start timing before the write end point and generating a second signal indicative of the write end point thereafter, a period between the first signal and the second signal is shorter than the width of the connecting region.

15. A magnetic disk tester claimed in claim 14, wherein the magnetic disk has a plurality of tracks that includes the predetermined track, and wherein a defect test of the magnetic disk is performed for concentric circles correspondingly to the plurality of the test tracks respectively and the write end point is determined by using a sector signal in the write start point of the test signal or an index signal as a reference.

16. A magnetic disk test method claimed in claim 15, wherein the test inhibit gate signal has a test inhibit region determined by a predetermined width from the first signal to the second signal, an overwritten width and the predetermined width are stored in a memory as data, the write end point is determined according to data for the overwritten width read out from said memory and the first signal and the second signal are generated by counting time by using the sector signal or the index signal as a reference according to data read out from said memory.

* * * * *